Patented Dec. 2, 1947

2,431,983

UNITED STATES PATENT OFFICE 2,431,983

OPTICAL GLASS

Raymond Edward Bastick and Wilfred Marsh Hampton, Smethwick, England, assignors to Chance Brothers Limited, Smethwick, England No Drawing. Application June 8, 1944, Serial No. 539,383. In Great Britain May 31, 1943

Section 1, Public Law 690, August 8, 1946
Patent expires February 18, 1964

4 Claims. (Cl. 106—53)

This invention relates to optical glasses and particularly glasses required for photographic lenses.

The invention comprises glasses having the following essential constituents and within the range of proportions specified, namely:

| | Per cent |
|---|---|
| Silicon dioxide | 10–25 |
| Barium oxide | 10–35 |
| Lead monoxide | 10–20 |
| Boron trioxide | 10–25 | together with substantial quantities of both lanthanum and thorium oxides which are sufficient to produce a glass having a refractive index $nd$ and Abbe constant V satisfying the relationship— $nd$ is greater than $1.746-0.0021V$; wherein V has a value lying between 40 and 50. The quantities of lanthanum and thorium oxides together do not exceed 35% of the glass composition, the amount of lanthanum oxide being not greater than 20%, and the amounts of lead and barium oxides together not exceeding 45% of the glass composition.

In carrying the invention into effect we may employ in addition to the above specified essential constituents, one or more of the following substances: beryllium, zirconium, zinc and aluminium oxides. These additional substances are not essential to the optical properties of the glasses, but they improve their stability in the vitreous state and their weathering properties.

The refractive index $nd$ and Abbe constant V of our improved glasses satisfy the relationship— $nd$ is greater than $1.746-0.0021V$; where V has a value lying between 40 and 50.

In the development of our improved glasses we have found that glasses containing high percentages of lanthanum oxide have a strong tendency to devitrify during manufacture, but the addition of thorium oxide reduces this tendency and also enables high refractive indices to be obtained. The following table gives particulars of typical glasses made in accordance with the invention:

| Constituents | A, per cent | B, per cent | C, per cent | D, per cent | E, per cent |
|---|---|---|---|---|---|
| $SiO_2$ | 15.3 | 11.3 | 11.3 | 15.3 | 15.3 |
| $BaO$ | 34.2 | 14.7 | 16.7 | 19.2 | 24.2 |
| $PbO$ | 10.2 | 12.7 | 12.7 | 12.7 | 10.2 |
| $B_2O_3$ | 15.5 | 19.5 | 19.5 | 15.5 | 15.5 |
| $La_2O_3$ | 10.0 | 18.0 | 20.0 | 20.0 | 20.0 |
| $ThO_2$ | 13.8 | 13.3 | 11.8 | 13.8 | 13.8 |
| $K_2O$ | 1.1 | | 1.1 | 1.1 | 1.1 |
| $ZnO$ | | 3.1 | | | |
| $ZrO_2$ | | 7.5 | 5.0 | | |
| $Al_2O_3$ | | | 2.0 | | |
| $BeO$ | | | | 2.5 | |
| $nd$ | 1.705 | 1.744 | 1.721 | 1.719 | 1.721 |
| $V$ | 47.7 | 44.7 | 45.8 | 46.6 | 47.3 |

It will be noted that the lanthanum oxide in the above compositions varies between 10 to 20 per cent while the thorium oxide varies between 11.8 and 13.8 per cent.

In the manufacture of these glasses it is important that the constituents should be melted in crucibles made from a material which is inert to any of the constituents, platinum crucibles being preferable.

Having thus described our invention what we claim as new and desire to secure by Letters Patent is:

1. An optical glass having the following essential constituents and within the range of proportions specified, namely:

| | Per cent |
|---|---|
| Silicon dioxide | 10–25 |
| Barium oxide | 10–35 |
| Lead monoxide | 10–20 |
| Boron trioxide | 10–25 | together with substantial quantities of both lanthanum and thorium oxides which are sufficient to produce a glass having a refractive index $nd$ and Abbe constant V satisfying the relationship—$nd$ is greater than $1.746-0.0021V$; wherein V has a value lying between 40 and 50, but which together do not exceed 35% of the glass composition, the amount of lanthanum oxide being not greater than 20%, and the amounts of lead and barium oxides together not exceeding 45% of the glass composition.

2. An optical glass as claimed in claim 1 and containing at least one of the following substances: beryllium oxide, zirconium oxide, zinc oxide, aluminum oxide.

3. An optical glass having the following essential constituents within the range of proportions specified, namely:

| | Per cent |
|---|---|
| Silicon dioxide | 10 –25 |
| Barium oxide | 10 –35 |
| Lead monoxide | 10 –20 |
| Boron trioxide | 10 –25 |
| Lanthanum oxide | 10 –20 |
| Thorium oxide | 11.8–13.8 | wherein the amounts of lead and barium oxides together do not exceed 45% of the glass composition.

4. The optical glass of claim 3 wherein a small but effective amount is present of at least one metal oxide selected from the group consisting of beryllium oxide, zirconium oxide, zinc oxide and aluminum oxide.

RAYMOND EDWARD BASTICK.
WILFRED MARSH HAMPTON.

REFERENCES CITED

The following references are of record in the file of this patent:

UNITED STATES PATENTS

| Number | Name | Date |
|---|---|---|
| 1,968,854 | Pirani et al. | Aug. 7, 1934 |
| 2,206,081 | Eberlin | July 2, 1940 |
| 2,241,249 | Eberlin et al. | May 6, 1941 |
| 2,297,453 | Berger et al. | Sept. 29, 1942 |

FOREIGN PATENTS

| Number | Country | Date |
|---|---|---|
| 7,864 | Great Britain | 1913 |
| 688,148 | Germany | 1940 |